US008502454B2

(12) United States Patent
Sadwick

(10) Patent No.: US 8,502,454 B2
(45) Date of Patent: Aug. 6, 2013

(54) SOLID STATE SEMICONDUCTOR LED REPLACEMENT FOR FLUORESCENT LAMPS

(75) Inventor: Laurence P. Sadwick, Salt Lake City, UT (US)

(73) Assignee: InnoSys, Inc, Salt Lake City, UT (US)

(*) Notice: Subject to any disclaimer, the term of this patent is extended or adjusted under 35 U.S.C. 154(b) by 717 days.

(21) Appl. No.: 12/367,539

(22) Filed: Feb. 8, 2009

(65) Prior Publication Data

US 2010/0033095 A1  Feb. 11, 2010

Related U.S. Application Data

(60) Provisional application No. 61/027,115, filed on Feb. 28, 2008.

(51) Int. Cl.
 H05B 37/02 (2006.01)
(52) U.S. Cl.
 USPC .................................. 315/51; 315/291
(58) Field of Classification Search
 None
 See application file for complete search history.

(56) References Cited

U.S. PATENT DOCUMENTS

| | | | |
|---|---|---|---|
| 4,629,944 A * | 12/1986 | Maytum et al. | 315/207 |
| 4,914,356 A | 4/1990 | Cockram | |
| 5,404,080 A | 4/1995 | Quazi | |
| 5,463,280 A * | 10/1995 | Johnson | 315/187 |
| 5,581,158 A | 12/1996 | Quazi | |
| 5,734,564 A | 3/1998 | Brkovic | |
| 6,081,075 A | 6/2000 | Littlefield | |
| 6,295,217 B1 | 9/2001 | Yang et al. | |
| 6,388,393 B1 * | 5/2002 | Illingworth | 315/291 |
| 6,392,368 B1 | 5/2002 | Deller et al. | |
| 6,462,485 B1 | 10/2002 | Kimball | |
| 6,577,512 B2 | 6/2003 | Tripathi et al. | |
| 6,853,151 B2 | 2/2005 | Leong | |
| 6,927,989 B2 | 8/2005 | Fukumoto | |
| 6,936,968 B2 * | 8/2005 | Cross et al. | 315/74 |
| 6,965,205 B2 | 11/2005 | Piepgras et al. | |
| 7,151,246 B2 | 12/2006 | Fein et al. | |
| 7,151,345 B2 | 12/2006 | Sanchez | |
| 7,161,313 B2 | 1/2007 | Piepgras et al. | |
| 7,178,941 B2 | 2/2007 | Roberge et al. | |
| 7,183,724 B2 | 2/2007 | Ball | |
| 7,202,613 B2 | 4/2007 | Morgan et al. | |

(Continued)

FOREIGN PATENT DOCUMENTS

WO  WO03/096761 A1  11/2003
WO  WO2008/137460 A2  11/2008

OTHER PUBLICATIONS

Supplemental European Search Report re EP10762548, Dec. 18, 2012.

(Continued)

Primary Examiner — Crystal L Hammond
(74) Attorney, Agent, or Firm — Hamilton, DeSanctis & Cha

(57) ABSTRACT

Various apparatuses and methods for replacing a fluorescent lamp with a non-fluorescent tube are disclosed herein. For example, some embodiments provide an apparatus for replacing a fluorescent lamp, including an electrical connector adapted to electrically connect to a fluorescent lamp fixture, a DC rectifier connected to the electrical connector, a voltage converter connected to the DC rectifier, and a non-fluorescent light source connected to the voltage converter. The DC rectifier, voltage converter and non-fluorescent light source are substantially contained within a housing that is physically configured to replace the fluorescent lamp in a fluorescent lamp fixture.

19 Claims, 12 Drawing Sheets

U.S. PATENT DOCUMENTS

| | | |
|---|---|---|
| 7,233,115 B2 | 6/2007 | Lys |
| 7,256,554 B2 | 8/2007 | Lys |
| 7,262,559 B2 | 8/2007 | Tripathi et al. |
| 7,276,861 B1 | 10/2007 | Shteynberg et al. |
| 7,295,176 B2 | 11/2007 | Yang |
| 7,298,095 B2 | 11/2007 | Nukisato et al. |
| 7,358,706 B2 | 4/2008 | Lys |
| 7,378,805 B2 | 5/2008 | Oh et al. |
| 7,441,922 B2 | 10/2008 | Huang et al. |
| 7,459,864 B2 | 12/2008 | Lys |
| 7,478,941 B2 | 1/2009 | Wu et al. |
| 7,511,437 B2 | 3/2009 | Lys et al. |
| 7,557,519 B2 | 7/2009 | Kranz |
| 8,115,421 B2 | 2/2012 | Mishima et al. |
| 8,203,445 B2 | 6/2012 | Recker et al. |
| 2003/0085669 A1 | 5/2003 | Pak |
| 2005/0162101 A1 | 7/2005 | Leong et al. |
| 2006/0170373 A1 | 8/2006 | Yang |
| 2006/0220595 A1* | 10/2006 | Lu ................................ 315/291 |
| 2007/0025119 A1 | 2/2007 | Chang-Jien |
| 2007/0114986 A1 | 5/2007 | Yoshii |
| 2007/0228999 A1 | 10/2007 | Kit |
| 2008/0067953 A1 | 3/2008 | Kranz |
| 2008/0081423 A1 | 4/2008 | Sadwick et al. |
| 2008/0094837 A1* | 4/2008 | Dobbins et al. ............... 362/249 |
| 2008/0284346 A1 | 11/2008 | Lee |
| 2008/0290814 A1 | 11/2008 | Leong |
| 2009/0009994 A1 | 1/2009 | Wu et al. |

OTHER PUBLICATIONS

Written opinion of the international searching authority re PCT/US2010/030644, Oct. 20, 2011.

* cited by examiner

SOLID STATE SEMICONDUCTOR LED REPLACEMENT FOR FLUORESCENT LAMPS

CROSS REFERENCE TO RELATED APPLICATION

The present application claims priority to U.S. Provisional Patent Application No. 61/027,115 entitled "All Solid State Semiconductor LED Replacement For Fluorescent Lamps", filed Feb. 8, 2008. The aforementioned application is assigned to an entity common hereto, and the entirety of the aforementioned application is incorporated herein by reference for all purposes.

BACKGROUND

Lighting is needed in many applications including both consumer/residential and commercial markets. Fluorescent tube lighting is a significant source of lighting in many applications, particularly in commercial markets, for a number of reasons such as higher efficiency and longer life than incandescent bulbs. However, newer solid semiconductor lighting such as light emitting diodes (LEDs) have been developed having advantages over fluorescent tube lighting. Conversion from fluorescent tube lighting to newer technologies can be prohibitively costly due to characteristics that are fundamentally associated with fluorescent lighting. In general, fluorescent lights and lamps cannot run directly off the alternating current (AC) mains. To make fluorescent lighting practical and relatively easy to use, a ballast 10 is required to be placed between the AC mains 12 and the fluorescent lamp or tube 14 as illustrated in FIG. 1 to control and regulate the voltage, current and power applied to the fluorescent lamp 14. As a result, large fluorescent light fixtures including heavy ballasts 10, reflectors 16, and specific fluorescent tube connectors 20 are mounted in offices and homes around the world. Conversion from fluorescent tube lighting generally requires that the fluorescent lighting fixture or at least the ballast 10 be removed so that replacement lighting technology not requiring a ballast may be installed.

SUMMARY

Various apparatuses and methods for replacing a fluorescent lamp with a non-fluorescent tube are disclosed herein. For example, some embodiments provide an apparatus for replacing a fluorescent lamp, including an electrical connector adapted to electrically connect to a fluorescent lamp fixture, a DC rectifier connected to the electrical connector, a voltage converter connected to the DC rectifier, and a non-fluorescent light source connected to the voltage converter. The DC rectifier, voltage converter and non-fluorescent light source are substantially contained within a housing that is physically configured to replace the fluorescent lamp in a fluorescent lamp fixture.

In an embodiment of the apparatus for replacing a fluorescent lamp, the non-fluorescent light source comprises at least one LED.

In an embodiment of the apparatus for replacing a fluorescent lamp, the apparatus is adapted to connect through the electrical connector to an AC output of a fluorescent ballast in the fluorescent lamp fixture.

In an embodiment of the apparatus for replacing a fluorescent lamp, the fluorescent ballast comprises a magnetic ballast.

In an embodiment of the apparatus for replacing a fluorescent lamp, the fluorescent ballast comprises an electronic ballast.

In an embodiment of the apparatus for replacing a fluorescent lamp, the voltage converter is adapted to reduce a voltage from the DC rectifier.

In an embodiment of the apparatus for replacing a fluorescent lamp, the apparatus includes protection circuitry connected between the electrical connector and the DC rectifier in the housing. The protection circuitry is adapted to prevent a voltage exceeding a threshold value from passing through the protection circuitry.

In an embodiment of the apparatus for replacing a fluorescent lamp, the apparatus includes startup and feedback circuitry connected to the DC rectifier in the housing. The startup and feedback circuitry is adapted to simulate an electrical behavior of a fluorescent tube in response to a startup sequence from a ballast in the fluorescent lamp fixture.

In an embodiment of the apparatus for replacing a fluorescent lamp, the apparatus includes a power factor correction circuit connected to the DC rectifier in the housing.

In an embodiment of the apparatus for replacing a fluorescent lamp, the apparatus includes a cathode heater simulation circuit in the housing and switchably connected to the electrical connector. The cathode heater simulation circuit is adapted to simulate a fluorescent tube cathode when a ballast in the fluorescent lamp fixture is in a cathode heating mode.

In an embodiment of the apparatus for replacing a fluorescent lamp, the voltage converter comprises a pulse generator and a constant current driver.

In an embodiment of the apparatus for replacing a fluorescent lamp, the apparatus includes a current overload protection circuit connected to the voltage converter in the housing.

In an embodiment of the apparatus for replacing a fluorescent lamp, the apparatus includes a thermal protection circuit connected to the voltage converter in the housing. The thermal protection circuit is adapted to reduce a current to the non-fluorescent light source in inverse proportion to a temperature of the apparatus.

In an embodiment of the apparatus for replacing a fluorescent lamp, the apparatus includes a dimming circuit connected to the voltage converter in the housing. The dimming circuit is adapted to controllably reduce a current to the non-fluorescent light source.

Other embodiments provide a method of powering an LED replacement tube in a fluorescent lamp fixture. The method includes receiving an AC voltage input from the fluorescent lamp fixture, and converting the AC voltage to a power source for at least one LED in the LED replacement tube. The converting is performed by a power converter in the LED replacement tube.

In an embodiment of the method of powering an LED replacement tube in a fluorescent lamp fixture, the method includes rectifying the AC voltage to a DC voltage before the converting.

In an embodiment of the method of powering an LED replacement tube in a fluorescent lamp fixture, the method includes electrically simulating a fluorescent tube response to a startup sequences from a ballast in the fluorescent lamp fixture. The simulating is performed in the LED replacement tube.

In an embodiment of the method of powering an LED replacement tube in a fluorescent lamp fixture, the method includes controlling a power factor of the LED replacement tube resulting in a higher power factor, wherein the controlling is performed in the LED replacement tube.

In an embodiment of the method of powering an LED replacement tube in a fluorescent lamp fixture, the method includes dimming the at least one LED by reducing a current to the at least one LED in the LED replacement tube, wherein the dimming is performed in the LED replacement tube.

Other embodiments provide an apparatus for replacing a fluorescent lamp. The apparatus includes an electrical connector adapted to electrically connect to an AC output of a fluorescent ballast in the fluorescent lamp fixture. The apparatus also includes a cathode heater simulation circuit switchably connected to the electrical connector. The cathode heater simulation circuit is adapted to simulate a fluorescent tube cathode when a ballast in the fluorescent lamp fixture is in a cathode heating mode. The apparatus also includes a protection circuit connected to the electrical connector. The protection circuit is adapted to prevent a voltage exceeding a threshold value from passing through the protection circuit. The apparatus also includes a DC rectifier connected to the protection circuit, a power factor correction circuit connected to the DC rectifier. The apparatus also includes a startup and feedback circuit connected to the DC rectifier. The startup and feedback circuit is adapted to simulate an electrical behavior of a fluorescent tube in response to a startup sequence from a ballast in the fluorescent lamp fixture. The apparatus also includes a voltage converter connected to the DC rectifier and adapted to reduce a voltage from the DC rectifier. The apparatus also includes a current overload protection circuit connected to the voltage converter. The apparatus also includes a thermal protection circuit connected to the voltage converter. The thermal protection circuit is adapted to reduce a current from the voltage converter in inverse proportion to a temperature of the apparatus. The apparatus also includes a dimming circuit connected to the voltage converter. The dimming circuit is adapted to controllably reduce a current from the voltage converter. The apparatus also includes at least one LED connected to the voltage converter. The apparatus also includes a housing substantially containing the cathode heater simulation circuit, DC rectifier, power factor correction circuit, startup and feedback circuit, voltage converter, current overload protection circuit, thermal protection circuit, dimming circuit and at least one LED. The housing is physically configured to replace the fluorescent lamp in the fluorescent lamp fixture.

This summary provides only a general outline of some particular embodiments. Many other objects, features, advantages and other embodiments will become more fully apparent from the following detailed description, the appended claims and the accompanying drawings.

BRIEF DESCRIPTION OF THE DRAWINGS

A further understanding of the various embodiments may be realized by reference to the figures which are described in remaining portions of the specification. In the figures, like reference numerals may be used throughout several drawings to refer to similar components.

DESCRIPTION

Figure 1:
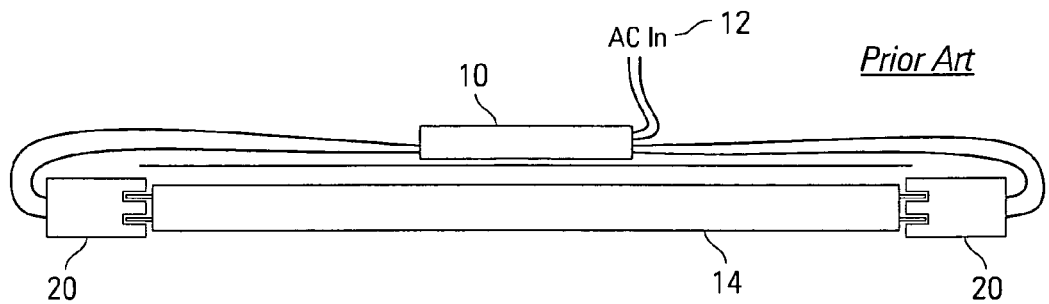
FIG. 1 depicts a prior art fluorescent lamp fixture.
Figure 2:
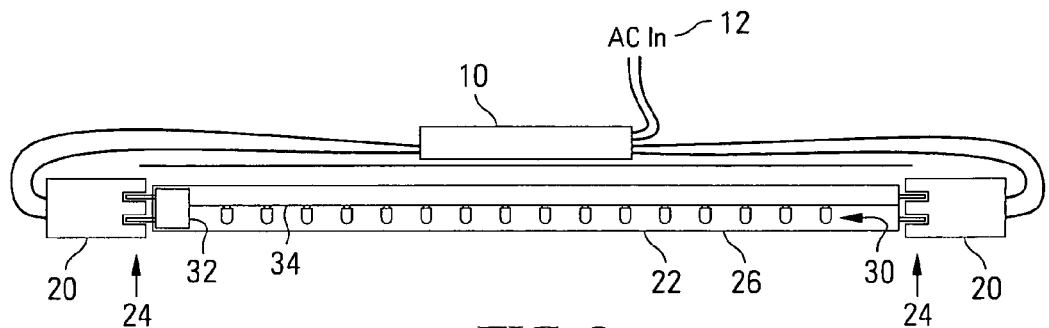
FIG. 2 depicts a fluorescent lamp fixture with a solid state semiconductor LED replacement for a fluorescent lamp with a single ended power converter in accordance with some embodiments.
Figure 3:
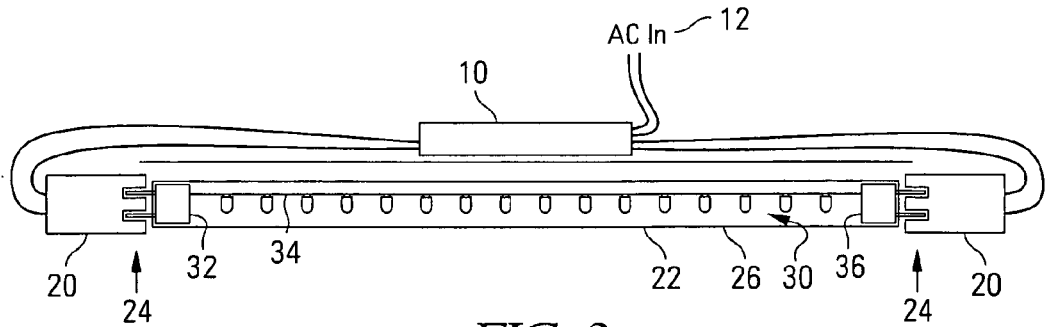
FIG. 3 depicts a fluorescent lamp fixture with a solid state semiconductor LED replacement for a fluorescent lamp with a double ended power converter in accordance with some embodiments.

The drawings and description, in general, disclose various embodiments of a solid state semiconductor LED replacement for fluorescent lamps. An embodiment is illustrated in FIG. 2, wherein a fluorescent lamp fixture includes an AC input 12 powering a ballast 10. An LED replacement tube 22 is inserted into the fluorescent lamp fixture in place of a fluorescent tube. The LED replacement tube 22 includes one or more electrical connectors 24 extending from the housing 26 of the LED replacement tube 22 to connect to the fluorescent tube connectors 20 in the fixture. The LED replacement tube 22 includes one or more non-fluorescent light sources, such as LEDs 30, that are electrically connected to a power converter 32, for example on a printed circuit board 34 or other electrically connective support structure. It is to be understood that the light sources in the LED replacement tube 22 can be any non-fluorescent light source, including LEDs and organic light emitting diodes (OLEDs). Thus, the term LED has been used generically throughout this document, including in the claims, to refer to any light source other than a fluorescent light source, including LEDs and OLEDs. The power converter 32 in various embodiments is adapted to draw power from the ballast 10 or from the AC mains 12 in the absence of a ballast 10 or given a non-functional ballast 10, and to convert the power from the ballast 10 or AC mains 12 for use by the LEDs 30. In other embodiments as illustrated in FIG. 3, multiple power converters 32 and 36 may be included, connecting in the fluorescent lamp fixture at both ends of the LED replacement tube 22. Any desired number and orientation of LEDs 30 may be included. For example, the LEDs 30 may be oriented to direct light substantially downward across an angle such as 180 degrees, or may be oriented across wider angles as illustrated in FIG. 4 to more closely resemble the light output of a fluorescent tube, thereby reflecting off a reflector 40 above the LED replacement tube 22 in the fluorescent lamp fixture.

The LED replacement tube 22 disclosed herein provides a high efficiency long life lamp replacement that is more environmentally friendly than fluorescent tubes. The LED replacement tube 22 may be used in place of fluorescent or neon tubes and is form function compatible with existing lamp fixtures and ballasts, both of the magnetic and electrical types of operation over a wide voltage range of operation offering high efficiency, high power factor and long life with environmentally friendly materials. The LED replacement tube 22 makes use of the standard tubular, spiral, or any other standard form factor lamp and ballast and related fixtures to allow an LED light source in a variety of shapes, sizes, colors, arrays, etc. to be used and inserted into existing and new fluorescent lamp fixtures of any length and any power, voltage and current combination. In one embodiment, the housing 26 consists of a tube that can be made of any suitable material including glass and/or plastic. In other embodiments, the housing 26 may have other shapes and sizes and may include a mixture of different materials, such as an opaque plastic upper portion and a substantially transparent plastic or glass lower portion. Yet other embodiments may have a partially open housing 26, such as an exposed support structure, e.g., a printed circuit board, with LEDs 30 mounted thereon and exposed to the air without covering. The LED replacement tube 22 may use any suitable type, number and configuration of LEDs 30 such as, for example, ultraviolet LEDs with a phosphor coating on the LEDs or on the housing 26 itself to produce suitable output light in the desired wavelength regions (i.e., white or visible light), or may use any number and combination of different colored LEDs to accomplish the desired illumination performance. The LED or LED array 30 is contained within the housing 26 and may have any shape or form including but not limited to circular, cylindrical, triangular, rectangular, square, string, helical, spiral, polygonal, perpendicular, etc. The power converter 32 is also contained within the housing 26 to convert the input alternating current (AC) voltage/current/power into the appropriate DC output required for the LED or LED arrays 30 to operate.

In one embodiment, the power converter 32 may supply an AC output of suitable voltage and frequency to drive LEDs connected in parallel and inverse fashion, that is, a parallel array of LEDs arranged anode to cathode and cathode to anode. In addition to the power converter 32 and LEDs 30, the LED replacement tube 22 may include various types of interfaces that permit both wired and wireless communications with the power converter 32 to permit monitoring, control, dimming, turn on, turn off, light sensor input, various sensor input, human input, automated and automated control system input etc., Bluetooth, web/internet-based, WIMAX, WIFI, telephone, cellular phone and all other types and standards for communications, etc. The support circuitry may be contained either entirely within the LED replacement tube 22, may be located outside the housing 26, or partially inside and partially outside. The power converter 32 may be adapted to operate with the existing ballast in place in the light fixture, or with the ballast removed and bypassed in the fixture.

Figure 4:
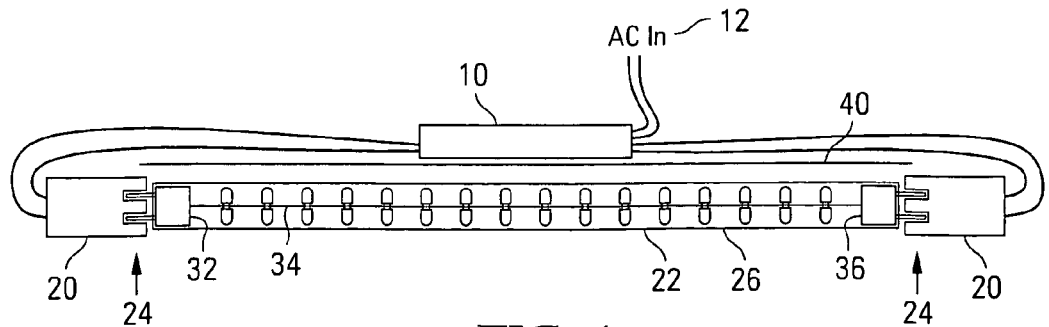
FIG. 4 depicts a fluorescent lamp fixture with a solid state semiconductor LED replacement for a fluorescent lamp with multi-directional LED orientation in accordance with some embodiments.

Again, the LEDs 30 may be directed in any desired manner, such as a unidirectional orientation to illuminate in one direction from the LED replacement tube 22 as illustrated in FIGS. 2 and 3, or may be configured to illuminate substantially in all directions, or in any other custom spotlight fashion (e.g., FIG. 4). Reflectors may also be included within the LED replacement tube 22 to produce the desired output.

Various embodiments of the power converter 32 in the LED replacement tube 22 are adapted to work with one or more types of ballasts 10 and fluorescent lamp fixture configurations. Ballasts 10 typically fall within one of two broad categories, magnetic and electric. Magnetic ballasts in general are older and less efficient ballasts that typically include an inductive coil and a starter circuit. Magnetic ballasts are also prone to failure after a certain number of years. In addition to being inefficient, magnetic ballasts also present poor electrical characteristics to the AC mains which can be viewed in terms of having a poor power factor. The output of a magnetic ballast should be an ideal sine wave usually at the same frequency as the AC mains (in general 50 to 60 hertz), however, the discussion and application discussed here is fully applicable to higher frequency (i.e., 400 Hz) magnetic ballasts. This sine wave can have the same or similar amplitude as the AC mains or the sine wave can have a higher amplitude than the AC mains. Typically magnetic ballasts have amplitudes similar to the AC mains which, depending on the type and diameter of the fluorescent tube, can range from around 100 VAC RMS up to over 400 VAC RMS with 120, 240 and 277 VAC RMS being commonly used in the United States.

Electronic ballasts are newer and more modern ways to efficiently light fluorescent lamps. Whereas magnetic ballasts tend to be very similar in their performance and operation and in general lack "smarts" or electronic intelligence, electrical ballasts have been designed and implemented in a wider variety from very simple to very complicated versions. Electronic ballasts include versions that have built in microprocessors and/or microcontrollers and other such electronic state machines capable of executing simple to complex timing sequences that are often required to best optimize factors such as the efficiency and lifetime of the fluorescent lamp based on the intrinsic and fundamental physics of the gas discharge and plasma physics and processes that govern fluorescent lamps. These electronic ballasts can be designed to provide excellent power factor correction and can be made to be very efficient in terms of electrical power usage and consumption. In addition, electronic ballasts can also be used to make decisions as to the condition and health of the fluorescent tube and even make a decision as to whether the fluorescent tube is no longer functional (i.e., burned out) or even present (i.e., installed). These types of decisions are typically based on electronic and electrical information fed back to the ballast during and after the electronic ballast is or is in the process of applying voltages, energy and power to the fluorescent lamp. Based on the sequence and responses to these voltages, the ballast is often designed to decide if the fluorescent lamp is behaving properly and in a normal mode such that a plasma discharge has been struck in the lamp and appropriate current is flowing through the fluorescent lamp (s). If the ballast receives information that indicates that there was not a turn on of or strike in the fluorescent lamp then, depending on the ballast design, the ballast may continue repeating the turn on sequence or may effectively shut down until commanded, typically by human intervention, to retry and restart the startup sequence. There are numerous variations of this basic approach depending on the design, manufacturer, end user, etc. of the electronic ballast. To complicate matters further, the output frequency and voltage can range from around 30 kHz (i.e., above the human audio range) to upwards of 100 kHz and even higher, again depending on the ballast design and intended application.

In addition to the output frequency bearing no direct relationship to the input AC mains frequency, the output voltages also in general bear no direct relationship to the input AC mains voltages, but instead are typically chosen based on the type of fluorescent lamp (with the diameter and length of the lamp being major considerations). As the use of "smart" electronics allows the possibility of huge and sometimes subtle variations in the start-up sequence that the ballast presents to the fluorescent lamp including how and when (i.e., the timing sequence and method of applying voltage to the fluorescent lamp) the ballast responds to the information fed back to the ballast from the lamp, it is important that the lamp behave in most every way in a manner that would be expected from a fluorescent lamp/light source. Fluorescent lamps also have heaters (which are also commonly referred to as filaments or cathodes) at each end of the lamp. How these heaters/filaments/cathodes are used and the associated timing sequence can have a dramatic effect on the life of the fluorescent tube and, in some cases, the life of the ballast as well.

There are three commonly recognized pre-heating or heating sequences utilized in electronic ballasts to strike or turn on the fluorescent lamp. These three sequences are often referred to as the preheat start, the instant start, and the rapid start. With the preheat start, power is first applied to the cathodes typically from less than one second to at most a few seconds before attempting to breakdown the gas in the fluorescent tube and strike a plasma. With instant start, no power is applied to the cathodes or power is applied at the same time as the high voltage is applied and this high voltage is applied across the fluorescent tube to strike a plasma with or without the assistance of electrons created at the cathodes. With rapid start, the cathodes are always heated resulting in a fast rapid start at the expense of "wasted energy" when the fluorescent lamp is not on (i.e., not lit for producing light). There are also variations of these three sequences that are used with and in electronic ballasts. During the start up sequence, the voltages that electronic ballasts put out can typically range from hundreds of volts up to one thousand volts or more depending on the ballast design and intended fluorescent tube type(s) (i.e., T12, T9, T8, T5, etc.) that the ballast is intended to drive, operate, support, etc. A common type of electronic ballast design uses a multi frequency or sweeping frequency resonance approach to breakdown the gas and strike a plasma in the fluorescent tube. The open circuit voltage of such a resonant approach can be quite high (in the thousands of volts) depending on a number of factors including the quality factor (Q) of the circuit.

In certain applications it may be desirable or necessary to replace fluorescent tubes with other light sources such as solid state light sources including LEDs and OLEDs. In general there are significant differences between fluorescent light sources and LED and OLED light sources. In general, fluorescent light sources require AC voltages containing as little as possible direct current (DC) voltages whereas, in general, LED and OLED light sources require primarily DC voltages and are potentially damaged by large AC voltages that swing in the negative direction (which reverse biases the LED and produces no light output) unless the LEDs or LEDs are arranged in a back to back configuration (i.e., for example, two LEDs are put in parallel with the cathode of the first LED attached to the anode of the second LED, and the anode of the first LED attached to cathode of the second LED). Needless to say, there can be numerous variations of the back to back configuration involving multiple LEDs (or OLEDs) placed in various parallel and series configurations. The voltage applied in these configurations should not exceed the reverse breakdown of any LED as doing so may cause damage or fatal failure to one or more of the LEDs.

In general, the LED replacement tube 22 used with an existing ballast 10 mimics both the behavior of a fluorescent tube lamp and also is adapted to survive the potentially high voltages associated with fluorescent lamps and ballasts.

Various embodiments of LED replacement tube 22 may include:

An integral AC to DC, AC to AC, or DC to DC circuit.

Circuitry to identify and handle instant on, rapid on and pre-heat sequences.

Circuitry designed specifically for use with magnetic or electronic ballasts or universal circuitry for use with both magnetic and electronic ballasts.

Protection circuitry to handle potentially high turn on voltages of ballasts.

Strike current mimic functionality to allow/permit ballast to determine that it is receiving the correct feedback.

High power factor correction for magnetic and low frequency ballasts.

Universal voltage ballast translator.

Power converters to convert high voltage AC into constant current DC.

Dimming functionality using conventional wall dimmers, infrared, wireless, analog, low voltage, Ethernet, USB, I2C, RS232, optical, parallel, UART, and other types of wired and wireless digital and/or analog transceivers, etc.

Color rendering, color monitoring, color feedback and control.

Temperature monitoring, feedback, and adjustment.

The ability to change to different colors when using light sources capable of supporting such (i.e., LEDs including but not limited to red, green, blue LEDs and/or any other possible combination of LEDs and colors).

The ability to store color choices, selections when using non-fluorescent light sources that can support color changing.

The ability to change between various color choices, selections, and associated inputs to do.

The ability to modulate the color choices and selections.

The use of either passive or active color filters and diffusers to produce enhanced lighting effects.

Circuitry to handle AC voltages up to and above 1 kV in amplitude and 100 KHz in frequency.

Figure 5:
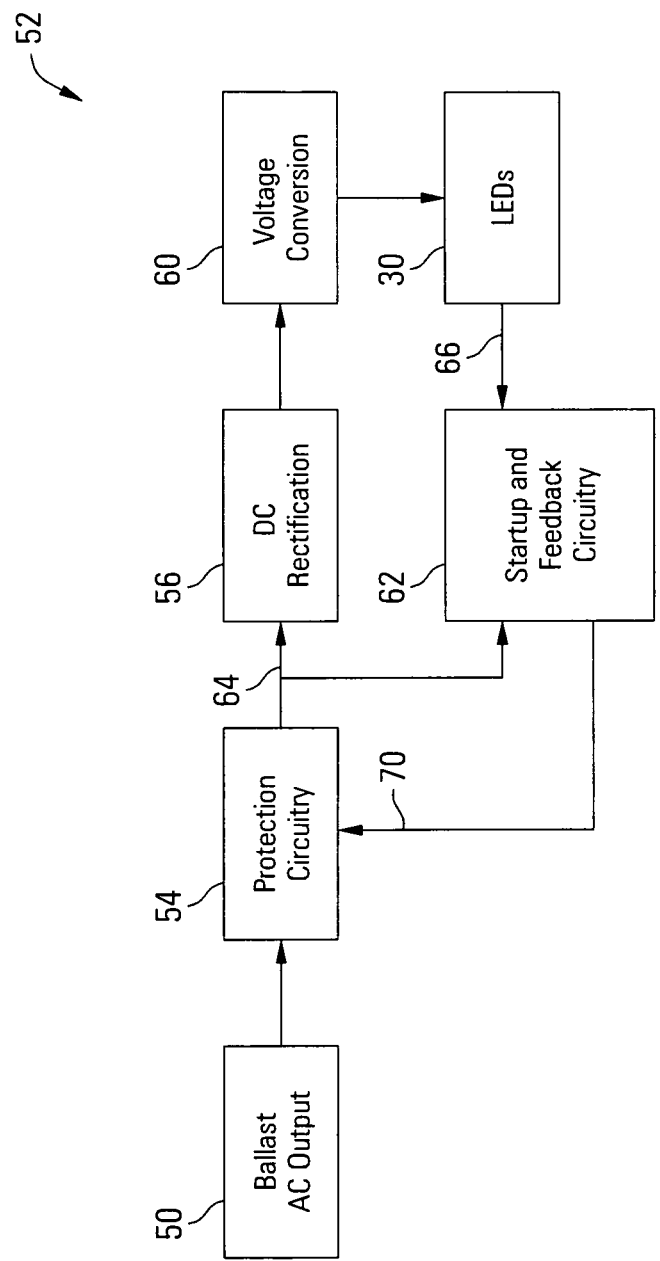
FIG. 5 depicts a block diagram of a power converter in accordance with some embodiments.

Referring now to FIG. 5, various embodiments of the LED replacement tube 22 will be described. An AC output 50 from a ballast 10 supplies power to a conversion circuit 52 within the LED replacement tube 22. The AC output 50 from a ballast 10 may have a frequency of 30 kHz up to 100 kHz or even higher, with a voltage of about 150 VAC up to 1000 VAC peak or more depending on the fluorescent tube and cathode being used. The conversion circuit 52 includes protection circuitry 54 that protects other components of the conversion circuit 52 and LEDs 30 from being damaged by high voltage/current/frequencies from the ballast 10 when it is turned on. The protection circuitry 54 may lower the voltage, or may harmlessly discharge the voltage if it exceeds a threshold value so that it cannot damage other components of the conversion circuit 52. For example, the protection circuitry 54 may include a spark gap connected in parallel with the connections from the AC output 50, shorting across the AC output 50 to discharge the voltage to prevent damage to the conversion circuit 52. In other embodiments, the protection circuitry 54 may include a switchably connected load that is applied when the voltage rises above a threshold value, loading down the ballast 10 and reducing the voltage, then being disconnected when the voltage falls to avoid triggering fault detection in the ballast 10. The protection circuitry 54 may also include a feedback controlled switch to connect or disconnect power from the AC output 50 to other elements of the conversion circuit 52.

A DC rectifier 56 is connected to the protection circuitry 54 to convert the AC power from the AC output 50 to DC power for use by the LEDs 30. Depending on the type of ballast 10 for which the conversion circuit 52 is intended, the DC rectifier 56 may be a high voltage rectifier, for example a 1 kV or 1.2 kV (or higher voltage) diode bridge of four or more diodes.

A voltage converter 60 such as a boost/buck or buck converter is connected to the DC rectifier 56 to reduce the voltage from the voltage converter 60, for example dropping the voltage down to 48 VDC or 12 VDC or to whatever voltage is suitable for the LEDs 30 connected to the voltage converter 60. Depending on how the LEDs are connected and configured, the voltage range could be from roughly around 3 volts DC to greater than 100 volts DC.

Startup and feedback circuitry 62 in the conversion circuit 52 processes feedback signals 64 and 66, particularly during the startup sequence, and provides control signals 70 to the protection circuitry 54. The startup and feedback circuitry 62 controls the protection circuitry 54 to protect the DC rectifier 56 and voltage converter 60 by applying a load resistor in the protection circuitry 54 to limit the voltage from the ballast 10, or to control a switch to connect the DC rectifier 56 to the protection circuitry 54, etc. The startup and feedback circuitry 62 is adapted to meet the needs of the ballast 10 so that it appears that a functional fluorescent tube is in place, as well as controlling the protection circuitry 54 to protect the conversion circuit 52 from damaging voltages, currents or frequencies.

Figure 6:
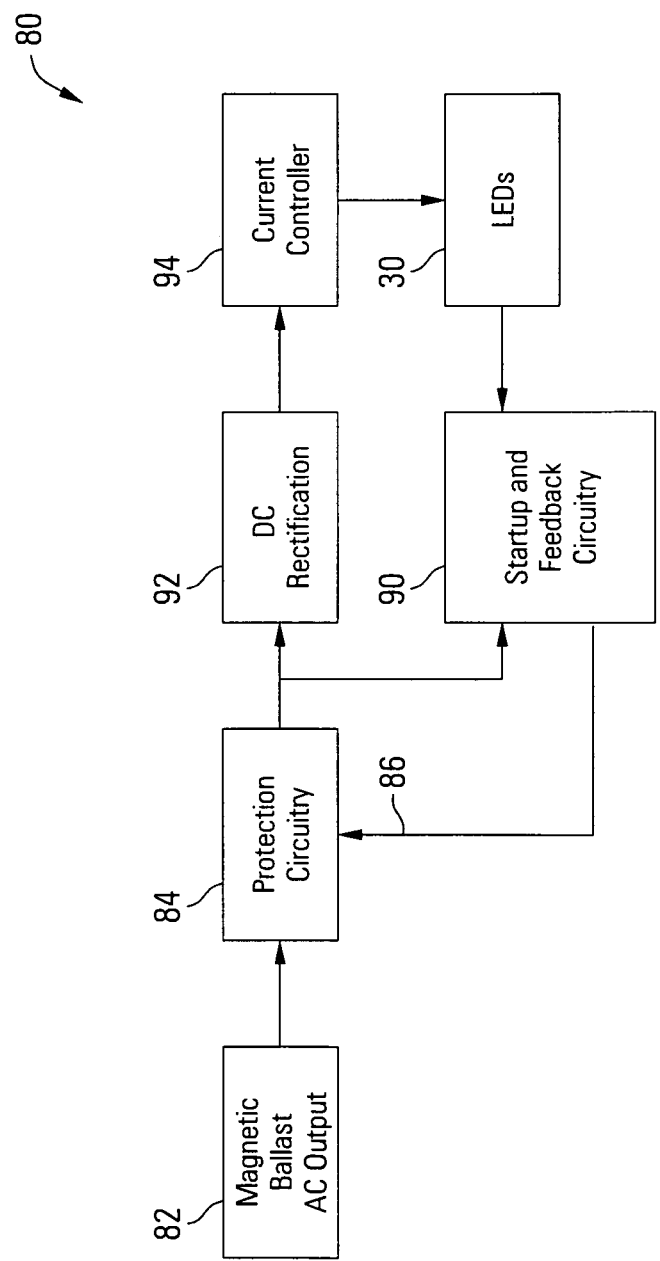
FIG. 6 depicts a block diagram of a power converter for use with a magnetic ballast in accordance with some embodiments.

Referring now to FIG. 6, an embodiment of a conversion circuit 80 is disclosed for use in an LED replacement tube 22 for a fluorescent lamp fixture having a magnetic ballast 10. In this embodiment, the magnetic ballast 10 supplies an AC voltage 82. Protection circuitry 84 is connected to the AC voltage 82 and provides voltage, current and/or frequency protection to the conversion circuit 80 from the magnetic ballast 10, as controlled by control signals 86 from startup and feedback circuitry 90. Although a magnetic ballast includes a starter that can supply high voltages during startup, a magnetic ballast tends to operate at a lower voltage than an electronic ballast. Furthermore, the magnetic ballast typically does not include complex error sensing circuitry that would require particular fluorescent tube simulation behaviors from the LED replacement tube 22. The operating frequency of the magnetic ballast is also much closer to that of the AC mains, reducing or eliminating a need for frequency compensation. The protection circuitry 84 thus may use lower voltage and slower components if desired than the protection circuitry 54 of FIG. 5.

A DC rectifier 92 is connected to the protection circuitry 84 to produce a DC voltage, and a current controller 94 generates a constant DC current for use by the LEDs 30. The current controller 94 may use any suitable circuit for generating a constant current. The startup and feedback circuitry 90 processes feedback from the output of the protection circuitry 84 and the LEDs 30, and as with the protection circuitry 84, may use simpler and less robust components than with an electronic ballast. The startup and feedback circuitry 90 in one embodiment may be as simple as a voltage divider and comparator to cause the protection circuitry 84 to disconnect from the DC rectifier 92 or to connect a resistor across the ballast 10 as a current limiter, particularly during startup or when the voltage otherwise rises. Simple startup circuits can be applied depending on the characteristics of the ballast 10 and, in some cases, the start-up circuit may not be needed or may not be activated. This can also be true due to the choice of components in the LED replacement tube 22 that are rated to survive the highest voltage produced by the ballast 10.

Figure 7:
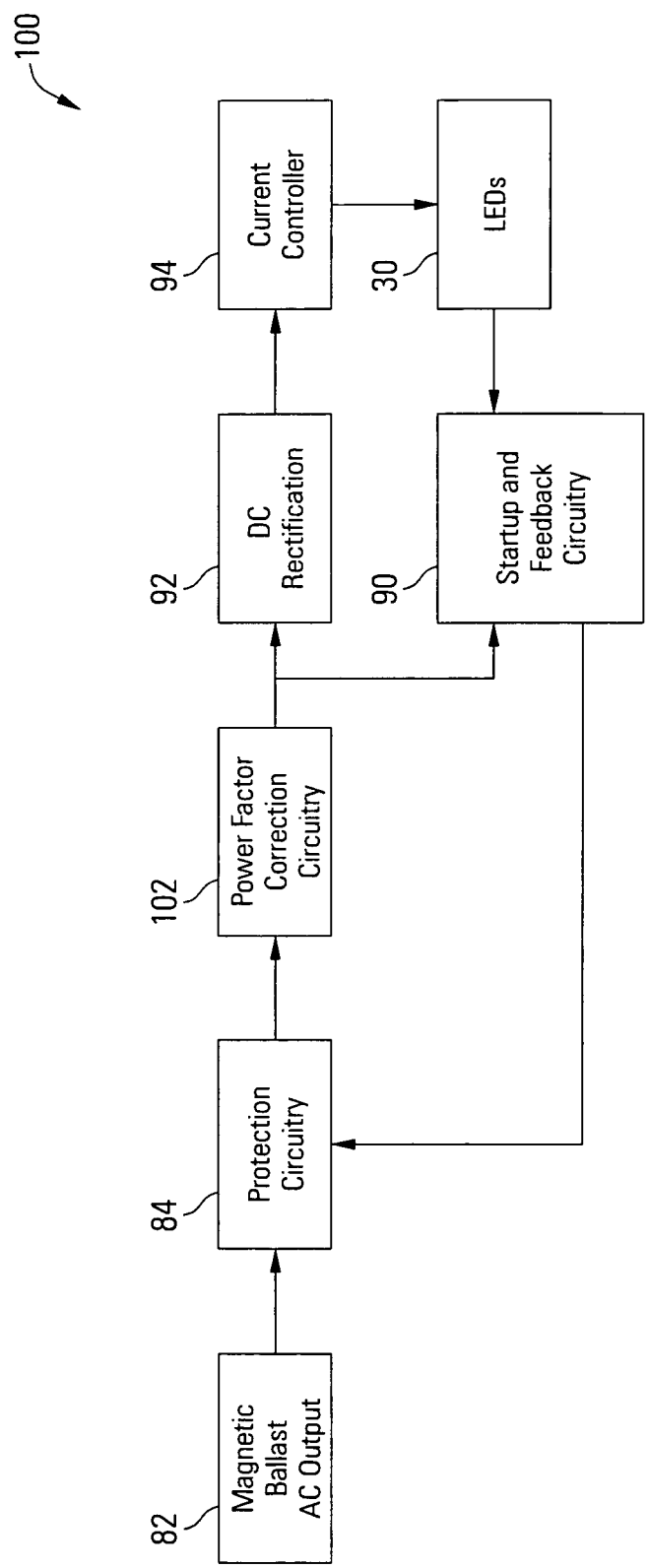
FIG. 7 depicts a block diagram of a power converter with power factor correction circuitry in accordance with some embodiments.
Figure 8:
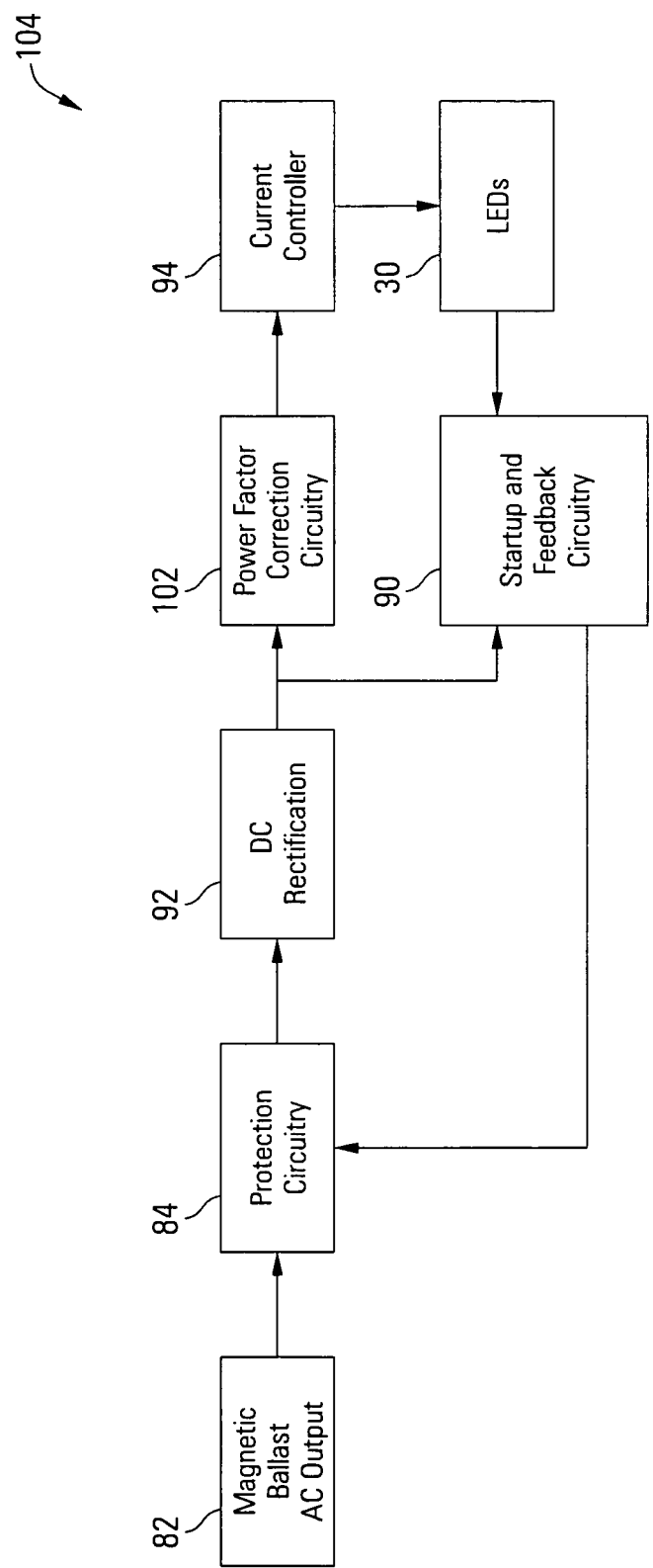
FIG. 8 depicts a block diagram of a power converter with power factor correction circuitry in accordance with some embodiments.

Referring now to FIG. 7, another embodiment of a conversion circuit 100 is powered by the AC output 82 of a magnetic ballast 10, with protection circuitry 84 controlled by startup and feedback circuitry 90 as in FIG. 6. In this embodiment, power factor correction circuitry 102 is connected between the protection circuitry 84 and DC rectifier 92. The power factor correction circuitry 102 compensates for the notoriously bad power factor of a magnetic ballast 10. The power factor correction circuitry 102 also functions if the magnetic ballast 10 is disconnected. The power factor correction may be performed before DC rectification as well, as in the conversion circuit 104 illustrated in FIG. 8. In this embodiment, the power factor correction circuitry 102 is connected to the output of the protection circuitry 84, and the DC rectifier 92 is connected to the output of the protection circuitry 84. The startup and feedback circuitry 90 in this embodiment operates on the output of the DC rectifier 92 and the LEDs 30 to control the protection circuitry 84.

Figure 9:
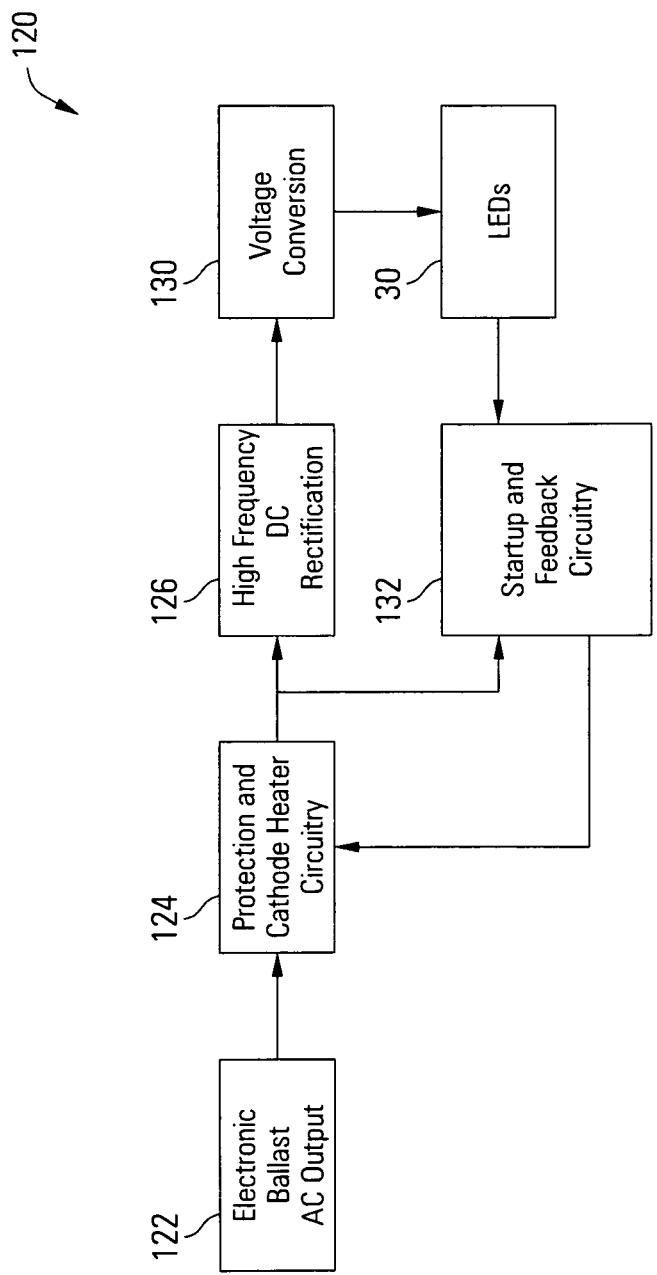
FIG. 9 depicts a block diagram of a power converter for use with an electronic ballast in accordance with some embodiments.

Referring now to FIG. 9, an embodiment of a conversion circuit 120 that may be used in an LED replacement tube 22 for a fluorescent lamp fixture having an electronic ballast 10 will be described. The conversion circuit 120 is powered by the AC output 122 of the electronic ballast 10. Protection and cathode heater circuitry 124 is connected to the AC output 122 to simulate a cathode heater for the electronic ballast 10. During startup when the electronic ballast 10 attempts to preheat the cathode of a fluorescent tube, the protection and cathode heater circuitry 124 presents a load such as a resistor that is typical of a cathode in the fluorescent tube being replaced. This load may be disconnected after the startup sequence for efficiency. Any suitable circuitry may be used in the protection and cathode heater circuitry 124 to connect and disconnect the cathode simulation load, such as an RC time constant or a timer circuit. Protective circuitry in the protection and cathode heater circuitry 124 also protects the conversion circuit 120 from excessive voltage using a device such as a spark gap or a load applied when the voltage exceeds a threshold value or to effectively perform such a function.

A high frequency DC rectifier 126 is connected to the protection and cathode heater circuitry 124 to convert the high frequency AC input to a DC voltage. The high frequency DC rectifier 126 uses, for example, ultrafast diodes to pass current from the very high frequencies from the electronic ballast 10. A voltage converter 130 is connected to the high frequency DC rectifier 126 to provide the proper DC voltage to the LEDs 30. Startup and feedback circuitry 132 connected to the output of the protection and cathode heater circuitry 124 and the LEDs 30 may also include high speed electronics to be able to react to the high frequency waveform from the protection and cathode heater circuitry 124.

Figure 10:
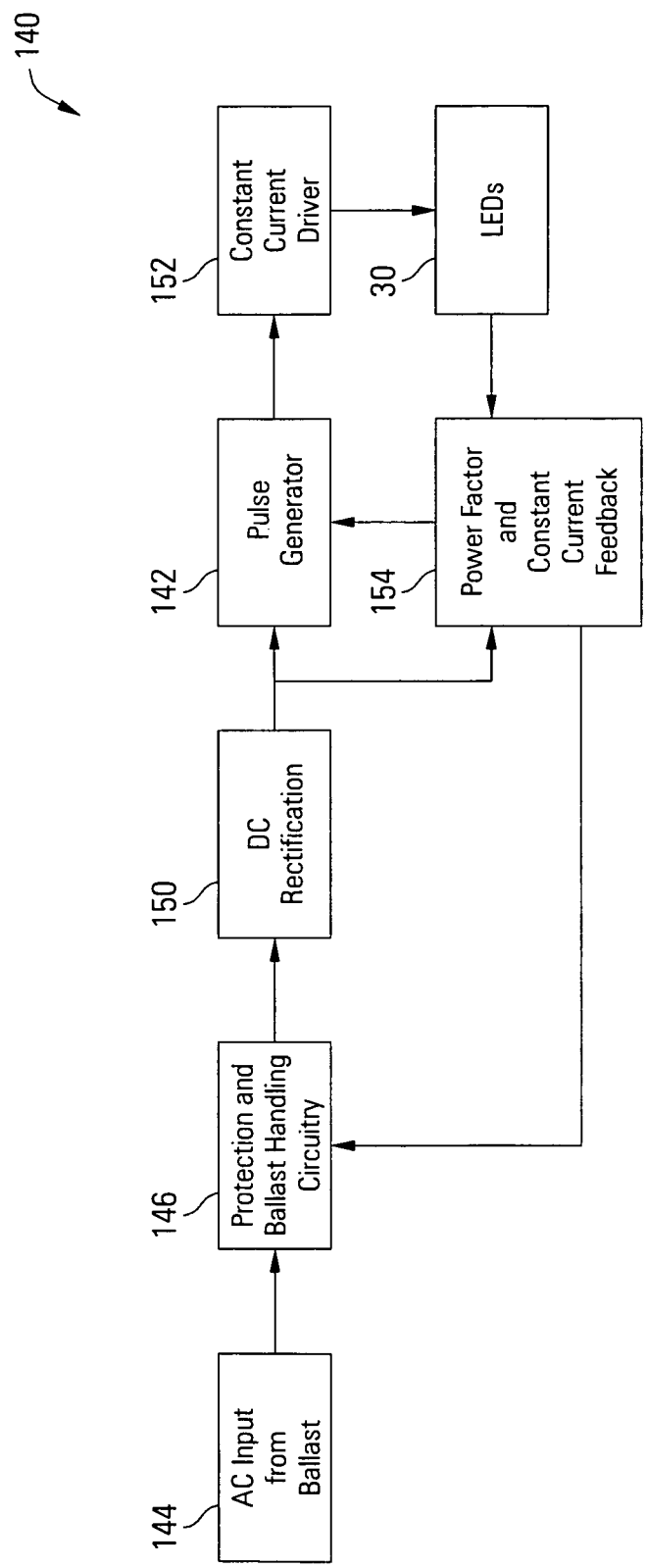
FIG. 10 depicts a block diagram of a power converter with protection and ballast handling circuitry in accordance with some embodiments.

Referring now to FIG. 10, an embodiment of a conversion circuit 140 is disclosed for use in an LED replacement tube 22 for a fluorescent lamp fixture having a magnetic or electronic ballast 10, in which a pulse generator 142 is used to control a current through the LEDs 30. The conversion circuit 140 is powered by an AC output 144 from the ballast 10. Protection and ballast handling circuitry 146 is connected to the AC output 144 as with previous embodiments, based on the type of ballast 10. A DC rectifier 150 is connected to the protection and ballast handling circuitry 146 to produce a DC voltage. The pulse generator 142 provides pulsed power from the DC rectifier 150 to control a constant current driver 152 in a switching power supply technique. The constant current driver 152 supplies a constant current to the LEDs 30. Power factor and constant current feedback circuitry 154 controls the timing and width of pulses generated by the pulse generator 142, as well as controlling the protection and ballast handling circuitry 146 as described above.

Figure 11:
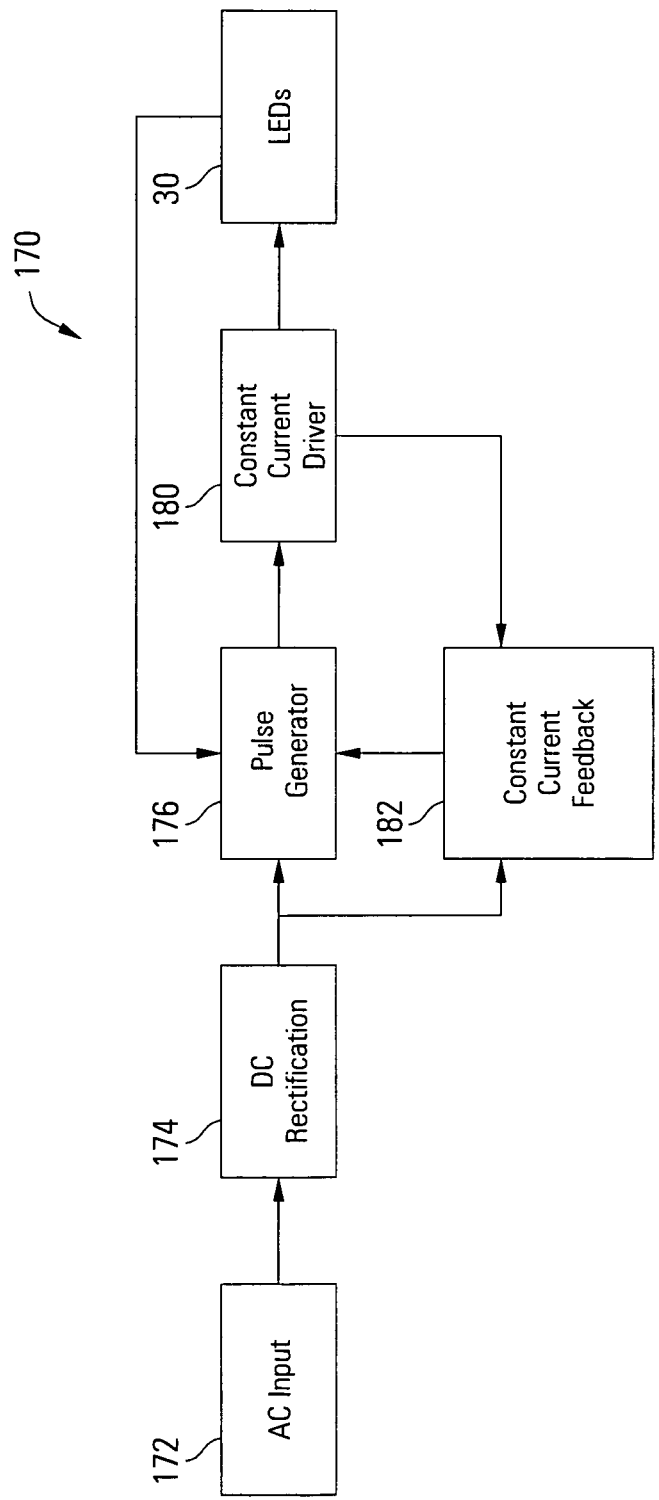
FIG. 11 depicts a block diagram of a power converter for use without a fluorescent ballast in accordance with some embodiments.

Referring now to FIG. 11, an embodiment of a conversion circuit 170 is disclosed for use in an LED replacement tube 22 for a fluorescent lamp fixture in which the ballast 10 has been removed or is otherwise bypassed or nonfunctional. The conversion circuit 170 is thus typically powered by a low voltage (in the range of less than 100 V to greater than 500 V), low frequency AC mains input 172. A DC rectifier 174 converts the AC input 172 to a DC voltage. A pulse generator 176 controls a constant current driver 180 to power the LEDs 30. Constant current feedback 182 is used by the pulse generator 176 to maintain a constant current from the constant current driver 180. The pulse generator 176, constant current driver 180 and constant current feedback 182 may be any suitable switch mode power supply circuit to power the LEDs 30 in the LED replacement tube 22 from a DC rectified AC mains input 172.

Figure 12:
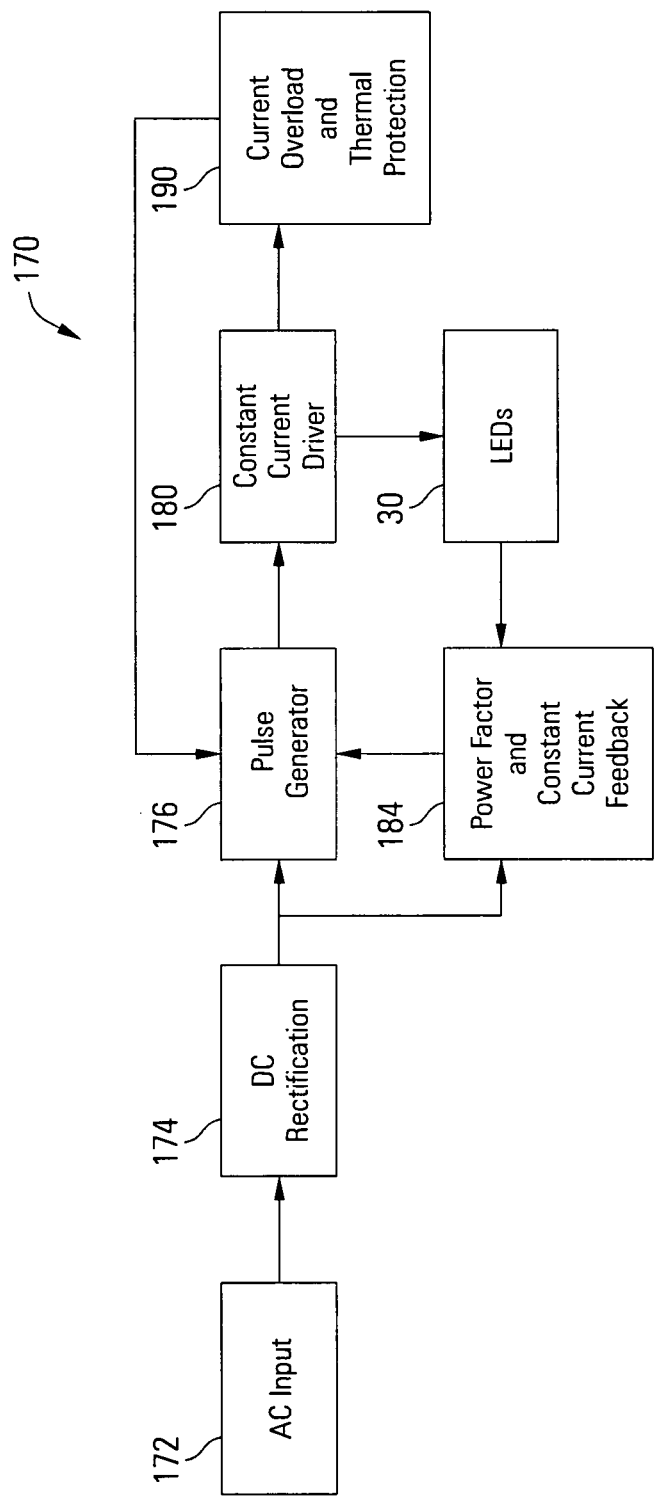
FIG. 12 depicts a block diagram of a power converter for use without a fluorescent ballast and including current overload and thermal protection in accordance with some embodiments.

Referring now to FIG. 12, another embodiment of a conversion circuit 170 is disclosed for use in an LED replacement tube 22 for a fluorescent lamp fixture in which the ballast 10 has been removed or is otherwise bypassed or nonfunctional. In this embodiment, power factor correction is included in the constant current feedback 184 to guarantee a good power factor from the pulse generator 176 and constant current driver 180. Current overload and thermal protection circuitry 190 is connected between the constant current driver 180 and pulse generator 176 to reduce the width or frequency of the pulses from the pulse generator 176 if the current through the LEDs 30 exceeds a threshold value or if the temperature of the conversion circuit 170 becomes excessive.

Figure 13:
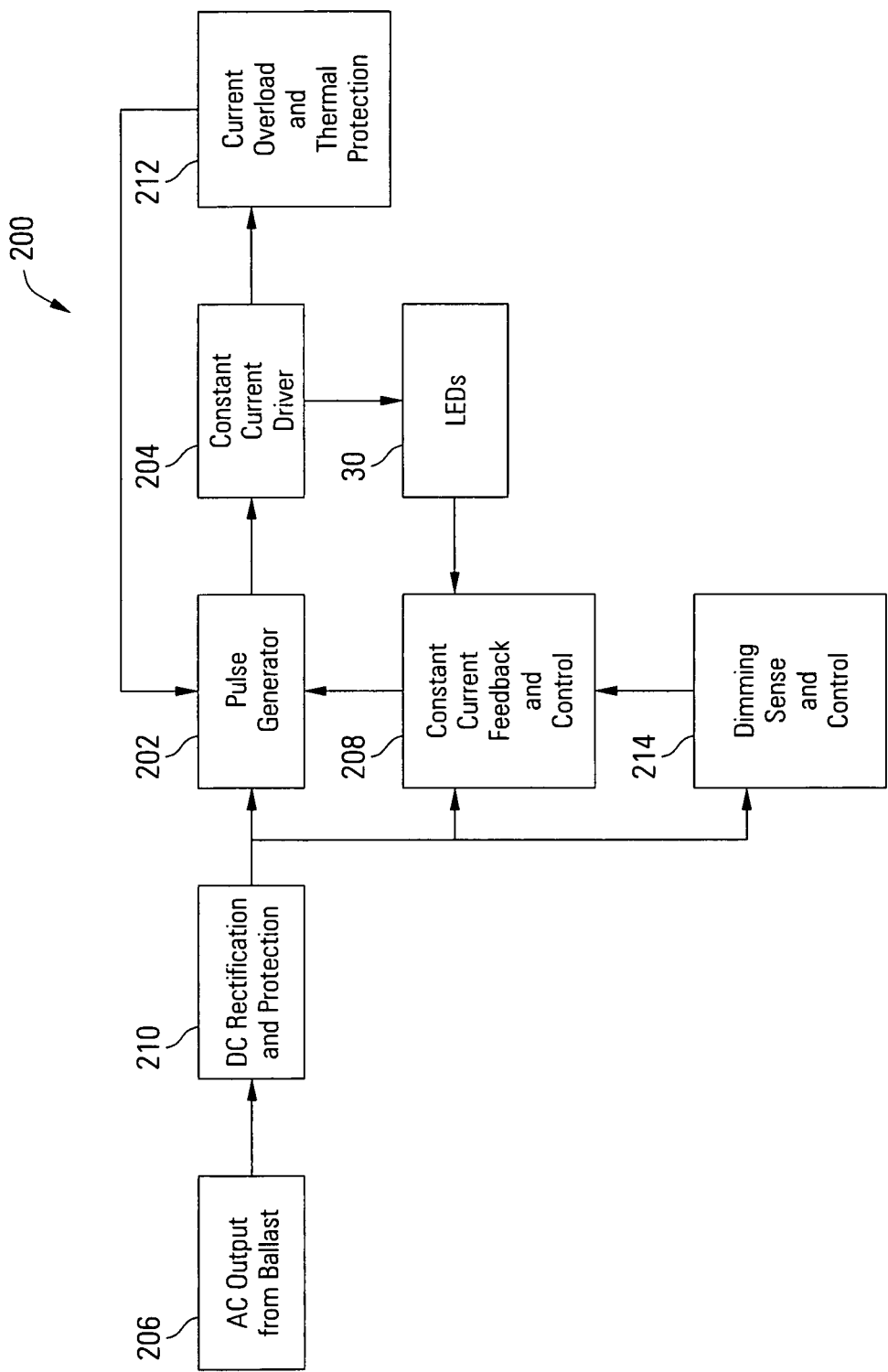
FIG. 13 depicts a block diagram of a power converter with current overload and thermal protection circuitry in accordance with some embodiments.

Referring now to FIG. 13, an embodiment of a conversion circuit 200 is disclosed for use in an LED replacement tube 22 for a fluorescent lamp fixture having a magnetic or electronic ballast 10, in which a pulse generator 202 and constant current driver 204 is used to control a current through the LEDs 30. The conversion circuit 200 is powered by an AC output 206 from the ballast 10. DC rectification and protection circuitry 210 is connected to the AC output 210 to rectify the AC input and to protect the conversion circuit 200 as with previous embodiments, based on the type of ballast 10. The pulse generator 202 provides pulsed power from the DC rectification and protection circuitry 210 to control the constant current driver 204 in a switching power supply technique. The constant current driver 204 supplies a constant current to the LEDs 30, as controlled by constant current feedback and control circuitry 208. Current overload and thermal protection circuitry 212 is connected between the constant current driver 180 and pulse generator 176 to reduce the width or frequency of the pulses from the pulse generator 176 if the current through the LEDs 30 exceeds a threshold value or if the temperature of the conversion circuit 170 becomes excessive. Dimming sense and control circuitry 214 is included in the conversion circuit 200 to enable dimming of the LEDs 30. The dimming sense and control circuitry 214 can dim the LEDs 30 by reducing the width or frequency of the pulses from the pulse generator 176, or by causing a dimmable electronic ballast 10 to dim the AC output 206 of the ballast 10. The dimming sense and control circuitry 214 may be controlled via a number of interfaces as described above, including wired and wireless interfaces, such as a digital addressable lighting interface (DALI), 0 to 10 VDC analog, pulse width modulation (PWM), digital multiplexing (DMX), etc. If the ballast 10 is dimmable, then it can perform the dimming functions itself or the dimming sense and control circuitry 214 may detect that the ballast 10 is attempting to dim, at which point the dimming sense and control circuitry 214 would narrow the pulses to dim the LEDs 30.

Figure 14:
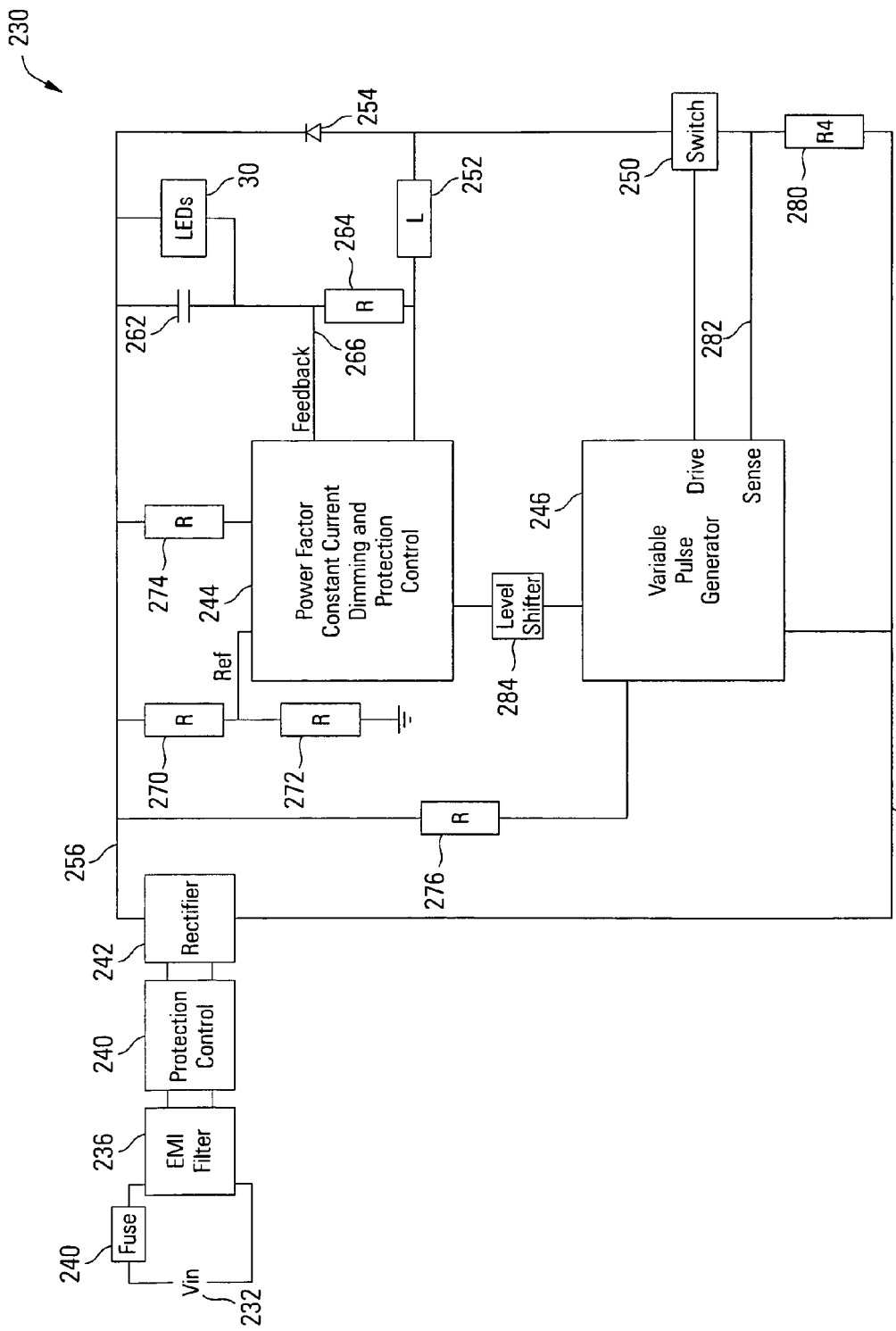
FIG. 14 depicts a block diagram of a power converter in accordance with some embodiments.

Referring now to FIG. 14, a more detailed block diagram of an embodiment of a conversion circuit 230 is illustrated. An AC input 232 powers the conversion circuit 230 through a fuse 234, an electromagnetic interference (EMI) filter 236, a protection control circuit 240 and a rectifier 242. Circuitry 244 for power factor control, constant current generation, dimming and protection control is included to perform the functions described above, again with variations depending on the presence and type of ballast 10. In this embodiment, a variable pulse generator 246 is driven by the control circuitry 244, and the variable pulse generator 246 controls constant current drive circuitry including a switch 250 such as a power FET, an energy storage device such as an inductor 252, and diode 254. In this embodiment, the switching power supply circuitry operates by pulling a current from an upper voltage rail 256 through the LEDs 30 and inductor 252 and switch 250 to a lower voltage rail 260 when a pulse from the variable pulse generator 246 is on, powering the LEDs 30 and storing energy in the inductor 252. When the pulse is off, the switch 250 is open, the inductor 252 resists the change in current and recirculates current through the diode 254, the LEDs 30 and inductor 252. A capacitor 262 may be connected in parallel with the LEDs 30 to smooth the voltage if desired. A current sensing resistor 264 provides a feedback signal 266 to the control circuitry 244. The inductor 252 may be replaced or augmented with a transformer and appropriate additional components and/or circuits to provide the same functionality in an isolated configuration (one example being in a flyback mode) and also multiple output taps to control different LEDs (i.e., red, green and blue LEDs) or configurations of LEDs (i.e., segments and bank arrangements and configurations). A voltage divider 270 and 272 may be used to supply a reference voltage to the control circuitry 244. The control circuitry 244 may be powered through a resistor 274 from the upper voltage rail 256. The variable pulse generator 246 may also be powered from the upper voltage rail 256 through a resistor 276. Current protection may be provided by a sense resistor 280 providing feedback 282 to the variable pulse generator 246. In this embodiment, the control circuitry 244 and variable pulse generator 246 operate at different potentials, so control signals from the control circuitry 244 to the variable pulse generator 246 may pass through a level shifter 284. The conversion circuit 230 used in a LED replacement tube 22 may be variously embodied with any suitable output driver and control circuitry, and is not limited to the specific examples set forth above.

Figure 15:
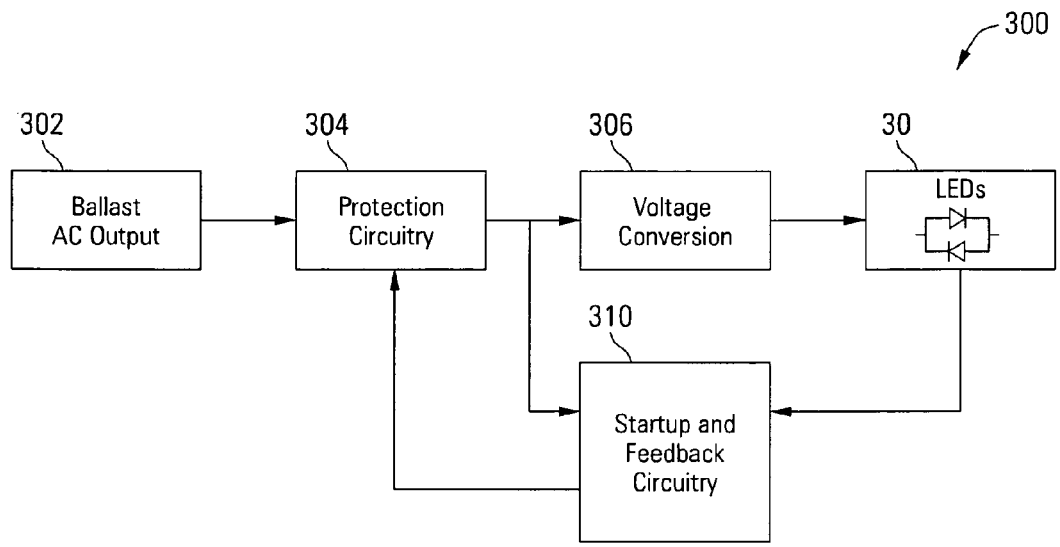
FIG. 15 depicts a block diagram of a power converter operating in an AC mode in accordance with some embodiments.

Referring now to FIG. 15, the various embodiments of the conversion circuit 300 in an LED replacement tube 22 may drive the LEDs 30 in an AC mode with a suitable voltage and frequency for LEDs 30 connected in parallel and inverse fashion, that is, a parallel array of LEDs arranged anode to cathode and cathode to anode. Any of the various embodiments, both described herein and otherwise, may be adapted to drive the LEDs 30 in AC mode, whether in the presence of a magnetic or electronic ballast 10 or in the absence of a ballast 10. For example, the conversion circuit 300 may be powered by an AC output 302 from a ballast 10. Protection circuitry 304 may be connected to the AC output 302 as discussed above to protect the conversion circuit 300. A voltage converter 306 may be used to adapt the level and frequency, as desired, from the protection circuitry 304 to power the LEDs 30. Startup and feedback circuitry 310 may be used in the conversion circuit 300 to adapt to the ballast 10, if any, as described above.

Various embodiments of the LED replacement tube 22 may also include multiple constant current sources if desired to drive, for example, multiple load groups such as banks of different types or colors of LEDs, etc. These embodiments can include any form(s) of parallel/series back to back configurations of the LEDs. In addition, for both AC and DC approaches, the embodiments and implementations can be designed to produce constant current output(s).

Figure 16:
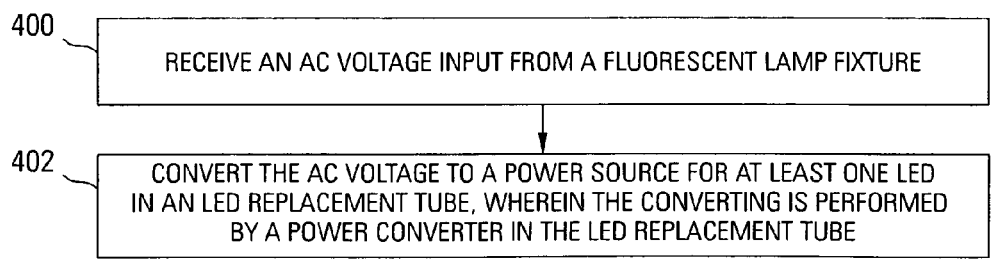
FIG. 16 is a flow chart of an exemplary operation for powering an LED replacement tube in a fluorescent lamp fixture.

A method for powering an LED replacement tube in a fluorescent lamp fixture is summarized in the flow chart of FIG. 16. The method includes receiving an AC voltage input from the fluorescent lamp fixture (block 400), and converting the AC voltage to a power source for at least one LED in the LED replacement tube, wherein the converting is performed by a power converter in the LED replacement tube (block 402). The method may further include rectifying the AC voltage to a DC voltage before the converting, and electrically simulating a fluorescent tube response to a startup sequences from a ballast in the fluorescent lamp fixture.

While illustrative embodiments have been described in detail herein, it is to be understood that the concepts disclosed herein may be otherwise variously embodied and employed. The configuration, arrangement and type of components in the various embodiments set forth herein are illustrative embodiments only and should not be viewed as limiting or as encompassing all possible variations that may be performed by one skilled in the art while remaining within the scope of the claimed invention.

What is claimed is:

1. An apparatus for replacing a fluorescent lamp, the apparatus comprising:
    an electrical connector adapted to electrically connect to a fluorescent lamp fixture;
    a DC rectifier connected to the electrical connector;
    a voltage converter connected to the DC rectifier;
    a non-fluorescent light source connected to the voltage converter;
    a housing substantially containing the DC rectifier, voltage converter and non-fluorescent light source, wherein the housing is physically configured to replace the fluorescent lamp in the fluorescent lamp fixture; and
    startup and feedback circuitry connected to the DC rectifier in the housing, the startup and feedback circuitry being adapted to simulate an electrical behavior of a fluorescent tube in response to a startup sequence from a ballast in the fluorescent lamp fixture, wherein the startup and feedback circuitry is operable to simulate the electrical behavior of the fluorescent tube when no fluorescent tube is installed in the fluorescent lamp fixture.

2. The apparatus of claim 1, wherein the non-fluorescent light source comprises at least one LED.

3. The apparatus of claim 1, wherein the apparatus is adapted to connect through the electrical connector to an AC output of a fluorescent ballast in the fluorescent lamp fixture.

4. The apparatus of claim 3, wherein the fluorescent ballast comprises a magnetic ballast.

5. The apparatus of claim 3, wherein the fluorescent ballast comprises an electronic ballast.

6. The apparatus of claim 1, wherein the voltage converter is adapted to reduce a voltage from the DC rectifier.

7. The apparatus of claim 1, further comprising protection circuitry connected between the electrical connector and the DC rectifier in the housing, the protection circuitry being adapted to prevent a voltage exceeding a threshold value from passing through the protection circuitry.

8. The apparatus of claim 1, further comprising a power factor correction circuit connected to the DC rectifier in the housing.

9. The apparatus of claim 1, further comprising a cathode heater simulation circuit in the housing and switchably connected to the electrical connector, wherein the cathode heater simulation circuit is adapted to simulate a fluorescent tube cathode when a ballast in the fluorescent lamp fixture is in a cathode heating mode.

10. The apparatus of claim 1, wherein the voltage converter comprises a pulse generator and a constant current driver.

11. The apparatus of claim 1, further comprising a current overload protection circuit connected to the voltage converter in the housing.

12. The apparatus of claim 1, further comprising a thermal protection circuit connected to the voltage converter in the housing, wherein the thermal protection circuit is adapted to reduce a current to the non-fluorescent light source in inverse proportion to a temperature of the apparatus.

13. The apparatus of claim 1, further comprising a dimming circuit connected to the voltage converter in the housing, wherein the dimming circuit is adapted to controllably reduce a current to the non-fluorescent light source.

14. A method of powering an LED replacement tube in a fluorescent lamp fixture, the method comprising:
    receiving an AC voltage input from the fluorescent lamp fixture;
    converting the AC voltage to a power source for at least one LED in the LED replacement tube, wherein the converting is performed by a power converter in the LED replacement tube; and
    simulating electrical behavior of a fluorescent tube in response to a startup sequence from a ballast in the fluorescent lamp fixture despite the fluorescent lamp fixture having no fluorescent tube installed.

15. The method of claim 14, further comprising rectifying the AC voltage to a DC voltage before said converting.

16. The method of claim 14, further comprising electrically simulating a fluorescent tube response to a startup sequences from a ballast in the fluorescent lamp fixture, wherein the simulating is performed in the LED replacement tube.

17. The method of claim 14, further comprising controlling a power factor the LED replacement tube resulting in a higher power factor, wherein the controlling is performed in the LED replacement tube.

18. The method of claim 14, further comprising dimming the at least one LED by reducing a current to the at least one LED in the LED replacement tube, wherein the dimming is performed in the LED replacement tube.

19. An apparatus for replacing a fluorescent lamp, the apparatus comprising:
    an electrical connector adapted to electrically connect to an AC output of a fluorescent ballast in the fluorescent lamp fixture;
    a cathode heater simulation circuit switchably connected to the electrical connector, wherein the cathode heater simulation circuit is adapted to simulate a fluorescent tube cathode when a ballast in the fluorescent lamp fixture is in a cathode heating mode;
    a protection circuit connected to the electrical connector, the protection circuit being adapted to prevent a voltage exceeding a threshold value from passing through the protection circuit;
    a DC rectifier connected to the protection circuit;

a power factor correction circuit connected to the DC rectifier;

a startup and feedback circuit connected to the DC rectifier, the startup and feedback circuit being adapted to simulate an electrical behavior of a fluorescent tube in response to a startup sequence from a ballast in the fluorescent lamp fixture;

a voltage converter connected to the DC rectifier and adapted to reduce a voltage from the DC rectifier;

a current overload protection circuit connected to the voltage converter;

a thermal protection circuit connected to the voltage converter, wherein the thermal protection circuit is adapted to reduce a current from the voltage converter in inverse proportion to a temperature of the apparatus;

a dimming circuit connected to the voltage converter, wherein the dimming circuit is adapted to controllably reduce a current from the voltage converter;

at least one LED connected to the voltage converter; and a housing substantially containing the cathode heater simulation circuit, DC rectifier, power factor correction circuit, startup and feedback circuit, voltage converter, current overload protection circuit, thermal protection circuit, dimming circuit and at least one LED, wherein the housing is physically configured to replace the fluorescent lamp in the fluorescent lamp fixture.

* * * * *